July 28, 1964   R. C. GORDON ET AL   3,142,477
PLASTIC FOAM MIXER
Filed Feb. 28, 1963

INVENTORS
CLETUS A. BECHT
ROBERT C. GORDON
NICHOLAS JOURILES
RAYMOND W. SHEATSLEY
BY

*A. H. Oldham*

ATTORNEY

United States Patent Office 3,142,477
Patented July 28, 1964

3,142,477
PLASTIC FOAM MIXER
Cletus A. Becht, Akron, Robert C. Gordon, Cuyahoga Falls, Nicholas Jouriles, Hudson, and Raymond W. Sheatsley, North Canton, Ohio, assignors to Goodyear Aerospace Corporation, Akron, Ohio, a corporation of Delaware
Filed Feb. 28, 1963, Ser. No. 261,735
7 Claims. (Cl. 259—44)

This invention relates to a plastic foam mixer apparatus particularly designed for use in a space environment.

Heretofore it has been known that there are many and varied ways to make plastic foam, but that all of these methods are cumbersome to operate, and usually must be operated by qualified human personnel. The mixing apparatus of the present art usually require large mixing apparatus and storage chambers, and by size and weight are not acceptable to use in a space environment.

It is the general object of the invention to avoid and overcome the foregoing and other difficulties of and objections to prior art practices by the provision of inexpensive, fully automatic apparatus of light weight and small size, functioning to store, mix and discharge plastic foam all combined in one integral unit operable in a space environment.

Another object of the invention is to provide a plastic foam mixer wherein a membrane or diaphragm ruptures after proper mixing and at a predetermined pressure in the mixing chamber to thereby assure the foam to be discharged properly.

Another object of the invention is to provide a plastic foam mixer wherein the chemical components of the mixture are stored therein in physically isolated relation to each other to prevent any mixing before foam is desired.

Another object of the invention is to provide a sealed plastic foam mixer characterized by a plurality of sealed containers from which chemicals are released at a desired time, and wherein the released chemicals are mixed by a plurality of paddles.

The aforesaid objects of the invention and other objects which will become apparent as the description proceeds are achieved by providing a sealed container with diaphragm covering one end, the materials necessary for a plastic foam being separately stored in the container, and which chemicals are released at a desired time by rotating blade means affixed to a rotatable shaft driven by drive means, and which chemicals are then mixed by a plurality of paddles mounted on the same shaft, and which mixture when properly mixed and having reacted chemically thereby creates a pressure which bursts the diaphragm allowing the foam to be directed to a desired destination.

Figure 1:
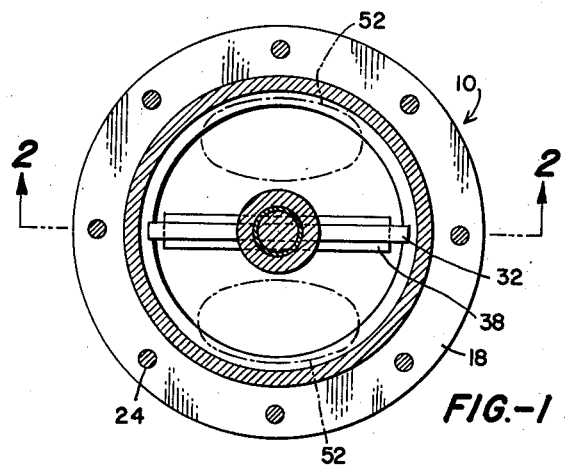
Figure 2:
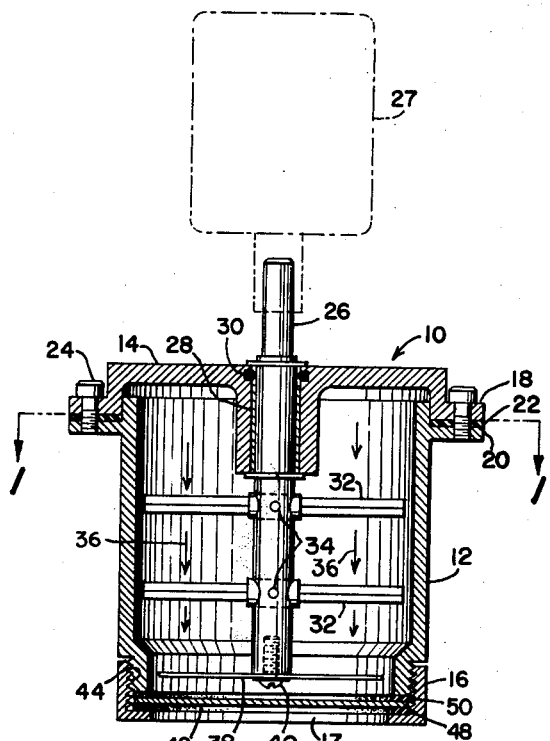

For a better understanding of the invention, reference should be had to the accompanying drawings, where:

FIGURE 1 is a horizontal cross sectional view of a foam mixer comprising one best known embodiment of the invention taken on line 1—1 of FIGURE 2; and FIGURE 2 is a vertical cross sectional view of the mixer taken on the line 2—2 of FIGURE 1.

With specific reference to the form of the invention illustrated in the drawings, the numeral 10 indicates generally a plastic foam mixer comprising a cylindrically-shaped, can-like mixing chamber 12, an end cap 14, and an end ring 16 having a circular opening 17 through it.

With specific reference to FIGURE 2, cap 14 has a radially outwardly directed endless flange 18 which engages with a radially outwardly directed endless flange 20 on the mixing chamber 12 when the cap 14 is slidably fitted onto the mixing chamber 12. A washer gasket 22 fits between the flanges 18 and 20 to thereby provide a seal between the cap 14 and the mixing chamber 12. A plurality of screws 24 hold the cap 14 in position on the mixing chamber 12.

A shaft 26 extends through the cap 14 on the longitudinal center line of the cap 14 as well as the longitudinal center line of the mixing chamber 12. The shaft 26 is rotatably mounted in the cap 14 as by an integral sleeve bearing 28. An O-ring 30 is provided to seal between the cap 14 and the shaft 26. A plurality of paddles 32 are fixedly mounted on the shaft 26 as by pins 34. Usually, a hole is drilled through the shaft of a slightly greater diameter than the diameter of the paddles 32 thereby allowing the paddles to be slipped into place and held by the pins 34. The paddles are shaped somewhat like blunt ended propellers with a twist of about 30 degrees usually being given to each blade. The twists are such that when the paddles are rotated, they will tend to cause a flow in the mixture in the direction of the arrows 36.

Also, mounted on the shaft 26 is a sharp, flat cutter blade 38. The plane of the blade 38 is mounted perpendicular to the longitudinal axis of the shaft 26, and the blade is held in place as by a screw 40. The primary purpose of the cutter blade is to release the packaged chemical ingredients, but this blade also helps to mix the ingredients.

A circular diaphragm 42 is provided to cover the opening 17 of the ring 16. Usually, endless circular gaskets 48 and 50 fit on each side of the diaphragm 42 to insure a tight seal between the ring 16, the diaphragm 42 and the mixing chamber 12, when the ring is screwed onto the mixing chamber 12. The thickness of the diaphragm 42 determines the rupture pressure differential. Therefore, if the mixer is to be used in a space environment the diaphragm must be thicker to provide proper mixing because outside the mixer the pressure is 0 lbs. per square inch while inside the mixer the pressure is about normal atmospheric pressure thereby creating a considerable initial pressure differential on the diaphragm. However, if the mixer were used at about atmospheric pressure the diaphragm would be thinner to thereby rupture after proper mixing had been achieved. Thus, the thickness of the diaphragm is determined by the environment in which the mixer is to be used, but in any case the thickness is designed to rupture only when proper mixing in the chamber has been achieved.

With specific reference to FIGURE 1, it is noted that the paddles 32 and the blade 38 lie substantially in the same plane so as to provide room for storage of the chemical components of the foam usually in some type of polyethylene or plastic bags 52.

In the use of the foam mixer 10, it is normally completely assembled with the exception of the ring 16 and the diaphragm 42. The mixer is placed so that the opening to be closed by the diaphragm is placed vertically upwardly. The plastic bags 52 are positioned in the mixer and the remainder of the space in the mixing chamber 12 is filled with the other chemical necessary to achieve the plastic foam. Normally, an isocyanate which is a rather watery substance, is packed in the plastic bags 52 and a polyester resin which is about the viscosity of honey fills the remainder of the mixing chamber 12. These components are usually of approximately the same density and are in approximately a one to one ratio, therefore making the bags 52 not liable to shaking and rupture during transportation or handling, and insuring that the chemicals will not mix until the desired time. The ring 16 with diaphragm 42 is then securely screwed on the top and sealed to make the mixer a completely sealed unit, and ready for action.

When the plastic foam is desired, the drive means shown in dotted lines at 27 and attached to the shaft 26 are energized to rotate the shaft 26. Any type of drive means can be employed, including gas, electrical, or mechanical that will provide enough power to sufficiently rotate the shaft 26 to insure a proper mixing of the foam materials. Usually, this mixing has to be accomplished with a relatively high rotational rate on the shaft 26 for a period of about 20 to 30 seconds. Therefore, when the shaft 26 begins to rotate, the cutter blade 38 slices the plastic bags 52, thereby releasing the isocyanate into the polyester resin. As soon as these materials are placed together, they are thoroughly mixed by the paddles 32 to insure a complete chemical reaction between the two components. This takes effect in an exothermic reaction with a corresponding increase in pressure as the components react chemically. As soon as the pressure has increased to the pressure limit of the diaphragm 42, the diaphragm will burst and let the plastic foam flow from the mixer 10. A directing channel or conduit (not shown) may be attached to the diaphragm end of the mixer 10 to direct the foam to the desired destination. Preferably the mixer is placed internally of the space in which the foam is to be deposited.

The plastic foam mixer shown and described can produce up to about 700 times the volume of the mixer 10, the foam setting in one to thirty minutes. However, depending upon the desired reaction and the chemical components in the mixer, the foregoing figures can be widely varied. For instance, the density is controllable by determining the amount or identity of the chemicals, which can be controlled as well whether the system be of an open or closed type.

It is noted, however, that proper mixing in the mixing chamber 12 is followed by development of the blow-out pressure on the diaphragm 42, and that this diaphragm 42 can be of any desired blow-out pressure to give the proper chemical reaction in the mixing chamber 12 before the diaphragm ruptures. It is highly important that proper mixing be first achieved in the chamber 12 before diaphragm blow-out as this gives better dimensional stability to the finished foam, as well as the proper set time and volume output.

It is recognized in the art that the necessity of light weight apparatus to inflate and hold a structure rigid in space is important. By use of the present invention, many structures in space can be inflated and rigidized with plastic foam to produce lightweight but durable structures. After use, the mixer 10 and drive apparatus may be discarded, or may be retained and refilled for further use.

Although the present invention has been described as a means to rigidize an object in space, it must be recognized that the apparatus could also be used for any desired plastic foam rigidizing purpose on earth or beneath the sea. Examples of practical uses would include rigidizing a radome structure surrounding and supporting a large parabolic antenna, rigidizing and buoyantly supporting a sea buoy, and rigidizing a submarine's buoyant support tanks.

While in accordance with the patent statutes one best known embodiment of the invention has been illustrated and described in detail, it is to be particularly understood that the invention is not limited thereto or thereby, but that the inventive scope is defined in the appended claims.

What is claimed is:

1. In a plastic foam mixer and dispenser, the combination of an integral cylindrically shaped hollow can-type mixing chamber, a ring removably screwed onto and sealed to one end of said chamber, said ring having an opening through its longitudinal center, a diaphragm removably sealed in the counterbore of said ring, a sealed closed cap removably mounted on the opposite end of the chamber, a shaft rotatably mounted in a bearing through said cap, said shaft being on the longitudinal center line of the container and the cap, a drive means connected to said shaft outside the mixer to rotatably drive said shaft, said shaft extending inside the container to almost touch the diaphragm secured in the ring, a plurality of sharp cutting blades fixedly mounted near the end of the extended shaft and perpendicular to the longitudinal axis of the shaft, said blades extending radially outwardly from the shaft with the tips of the blades in close proximity with the inner peripheral surface of the mixing chamber, a plurality of mixing paddles being fixedly mounted along the shaft between the blade and the closed cap, said paddles being perpendicular to the longitudinal axis of the shaft and extending radially outwardly from the shaft with the tips of the paddles in close proximity to the inner peripheral surface of the mixing chamber, each paddle having a uniform twist of the blades thereof from the original plane of the blades of 30°–40°, and means inside the mixing chamber to separately store the foam producing components, said separate storage means comprising a plurality of sealed plastic bags placed between the cutter blades and the paddles.

2. In a plastic foam mixer and dispenser, the combination of an integral cylindrically shaped hollow can-type mixing chamber, a ring removably screwed onto and sealed to one end of said chamber, said ring having an opening through its longitudinal center, a diaphragm removably sealed in the counterbore of said ring, a sealed closed cap removably mounted on the opposite end of the chamber, a shaft rotatably mounted in a bearing through said cap, said shaft being on the longitudinal center line of the container and the cap, a drive means connected to said shaft outside the mixer to rotatably drive said shaft, said shaft extending inside the container to almost touch the diaphragm secured in the ring, a plurality of sharp cutting blades fixedly mounted near the end of the extended shaft and perpendicular to the longitudinal axis of the shaft, a plurality of mixing paddles being fixedly mounted along the shaft between the blade and the closed cap, each paddle having a uniform twist of the blades thereof from the original plane of the blades of 30°–40°, and means inside the mixing chamber to separately store the foam producing components, said separate storage means comprising a plurality of sealed plastic bags placed between the cutter blades and the paddles.

3. In a plastic foam mixer and dispenser, the combination of a mixing chamber, a ring removably screwed onto and sealed to one end of said chamber, said ring having an opening through its longitudinal center, a diaphragm removably sealed in the counterbore of said ring, a sealed closed cap removably mounted on the opposite end of the chamber, a shaft rotatably mounted in a bearing through said cap, said shaft being on the longitudinal center line of the container and the cap, a drive means connected to said shaft outside the mixer to rotatably drive said shaft, a plurality of sharp cutting blades fixedly mounted near the end of the extended shaft and perpendicular to the longitudinal axis of the shaft, a plurality of mixing paddles being fixedly mounted along the shaft between the blade and the closed cap, each paddle having a uniform twist of the blades thereof from the original plane of the blades of 30°–40°, and means inside the mixing chamber to separately store the foam producing components, said separate storage means comprising a plurality of sealed plastic bags placed between the cutter blades and the paddles.

4. In a plastic foam mixer and dispenser, the combination of a mixing chamber, a ring removably screwed onto and sealed to one end of said chamber, said ring having an opening through its longitudinal center, a diaphragm removably sealed in the counterbore of said ring, a sealed closed cap removably mounted on the opposite end of the chamber, a shaft rotatably mounted in a bearing through said cap, said shaft being on the longitudinal center line of the container and the cap, a drive means connected to said shaft outside the mixer to rotatably drive said shaft, a plurality of sharp cutting blades fixedly mounted near the end of the extended shaft and perpendicular to the longitudinal axis of the shaft, a plurality of mixing paddles being fixedly mounted along the shaft between the blade and the closed cap, and means inside the mixing chamber to separately store the foam producing components, said separate storage means comprising a plurality of sealed plastic bags placed between the cutter blades and the paddles.

5. In a plastic foam mixer and dispenser, the combination of a mixing chamber, a ring removably screwed onto and sealed to one end of said chamber, said ring having an opening through its longitudinal center, a diaphragm removably sealed in the counterbore of said ring, a sealed closed cap removably mounted on the opposite end of the chamber, a shaft rotatably mounted in a bearing through said cap, said shaft being on the longitudinal center line of the container and the cap, a drive means connected to said shaft outside the mixer to rotatably drive said shaft, a plurality of sharp cutting blades fixedly mounted near the end of the extended shaft and perpendicular to the longitudinal axis of the shaft, a plurality of mixing paddles being fixedly mounted along the shaft between the blade and the closed cap, and means inside the mixing chamber to separately store the foam producing components.

6. In a plastic foam mixer and dispenser, the combination of a sealed mixing chamber, a rotatable shaft extending through one end of said chamber into said chamber, a plurality of cutting blades and a plurality of mixing blades removably mounted on said portion of the shaft extending inside the chamber, a pressure rupturable diaphragm on the other end of the mixing chamber, drive means fixedly attached to the shaft outside the mixing chamber, and means inside the mixing chamber to separately store the chemical components of the foam mixture.

7. The combination of storage, mixing and dispensing apparatus for resin foam materials including a chamber, a selectable thickness, pressure-rupturable diaphragm closing one side of the chamber, a plurality of resin foam producing chemicals separately stored in the chamber and separated by thin membranes, a cap sealing the chamber and removable for the introduction of the chemicals to the chamber, and means inside the chamber and operable from outside of the chamber for first breaking the membranes separating the chemicals, and for then mixing the chemicals to effect the foaming thereof, said diaphragm rupturing from the pressure developed when the chemicals are fully mixed to thereby discharge the foam from the chamber by the pressure built up in the foam.

References Cited in the file of this patent
UNITED STATES PATENTS

| | | |
|---|---|---|
| 2,957,203 | Marshall | Oct. 25, 1960 |
| 2,990,380 | Auerbach | June 27, 1961 |